United States Patent
Giessauf

(10) Patent No.: US 11,241,811 B2
(45) Date of Patent: Feb. 8, 2022

(54) METHOD AND DEVICE FOR VISUALIZING OR EVALUATING A PROCESS STATE

(71) Applicant: ENGEL AUSTRIA GmbH, Schwertberg (AT)

(72) Inventor: Josef Giessauf, Perg (AT)

(73) Assignee: ENGEL AUSTRIA GMBH, Schwertberg (AT)

( * ) Notice: Subject to any disclaimer, the term of this patent is extended or adjusted under 35 U.S.C. 154(b) by 0 days.

(21) Appl. No.: 17/009,170

(22) Filed: Sep. 1, 2020

(65) Prior Publication Data

US 2020/0391422 A1  Dec. 17, 2020

Related U.S. Application Data

(63) Continuation of application No. PCT/AT2019/060066, filed on Feb. 28, 2019.

(30) Foreign Application Priority Data

Mar. 2, 2018  (AT) .............................. A 50179/2018

(51) Int. Cl.
- *B29C 45/76* (2006.01)
- *B29C 45/78* (2006.01)
- *G05B 13/00* (2006.01)

(52) U.S. Cl.
CPC .......... *B29C 45/762* (2013.01); *B29C 45/768* (2013.01); *B29C 45/7613* (2013.01);
(Continued)

(58) Field of Classification Search
CPC . B29C 45/762; B29C 45/7613; B29C 45/768; B29C 45/78; G05B 13/00
See application file for complete search history.

(56) References Cited

U.S. PATENT DOCUMENTS

| 5,420,977 A | 5/1995 | Sztipanovits et al. |
| 5,470,218 A * | 11/1995 | Hillman ................ B29C 45/768 |
| | | 264/40.6 |

(Continued)

FOREIGN PATENT DOCUMENTS

| DE | 103 34 153 | 2/2005 |
| DE | 10 2011 112 736 | 4/2012 |

(Continued)

OTHER PUBLICATIONS

International Search Report dated Apr. 16, 2019 in International (PCT) Application No. PCT/AT2019/060066.

(Continued)

*Primary Examiner* — Ronald D Hartman, Jr.
(74) *Attorney, Agent, or Firm* — Wenderoth, Lind & Ponack, L.L.P.

(57) ABSTRACT

A method for evaluating and/or visualizing a process state of a production system, which contains at least one cyclically operating shaping machine, includes: continuously or at discrete times, determining the value of a plurality of selected process variables, and comparing the current value of each selected process variable and or a variable derived therefrom with one or more reference values by means a computing unit, and determining a deviation or a rate of change. Each selected process variable is assigned to at least one logical group by the computing unit; at least two different logical groups are provided; and for each logical group, a state of the logical group is evaluated by the computing unit based on the process variables assigned to the logical group and/or is visualized by a display device.

16 Claims, 10 Drawing Sheets

(52) U.S. Cl.
CPC .............. *B29C 45/78* (2013.01); *G05B 13/00* (2013.01); *B29C 2045/7606* (2013.01)

(56) References Cited

U.S. PATENT DOCUMENTS

| | | | |
|---|---|---|---|
| 5,539,650 A * | 7/1996 | Hehl | B29C 45/766 264/40.1 |
| 7,088,255 B2 | 8/2006 | Ridolfo et al. | |
| 7,117,050 B2 | 10/2006 | Sasaki et al. | |
| 7,295,887 B2 | 11/2007 | Matsumoto et al. | |
| 7,346,425 B2 | 3/2008 | Nishizawa et al. | |
| 7,421,309 B2 | 9/2008 | Nishizawa et al. | |
| 7,890,880 B2 | 2/2011 | Hehl | |
| 8,182,724 B2 | 5/2012 | Zhang et al. | |
| 9,937,650 B2 * | 4/2018 | Dimmler | G05B 19/409 |
| 10,093,056 B2 * | 10/2018 | Dimmler | B29C 45/1774 |
| 10,338,771 B2 | 7/2019 | Okochi et al. | |
| 2003/0005486 A1 | 1/2003 | Ridolfo et al. | |
| 2004/0148136 A1 | 7/2004 | Sasaki et al. | |
| 2005/0188376 A1 | 8/2005 | Matsumoto et al. | |
| 2006/0157880 A1 | 7/2006 | Hehl | |
| 2006/0247821 A1 | 11/2006 | Nishizawa et al. | |
| 2006/0247822 A1 | 11/2006 | Nishizawa et al. | |
| 2007/0156279 A1 | 7/2007 | Dalley | |
| 2010/0295199 A1 * | 11/2010 | Zhang | B29C 48/832 264/40.6 |
| 2016/0082504 A1 | 3/2016 | Okochi et al. | |
| 2016/0110032 A1 * | 4/2016 | Okochi | B22D 17/32 425/162 |
| 2016/0114514 A1 * | 4/2016 | Hakoda | B29C 45/74 425/144 |
| 2016/0224230 A1 * | 8/2016 | Fujita | B29C 45/76 |
| 2019/0111603 A1 * | 4/2019 | de Oliveira Antunes | B29C 45/76 |
| 2020/0282615 A1 * | 9/2020 | Yang | B29C 45/162 |

FOREIGN PATENT DOCUMENTS

| | | |
|---|---|---|
| DE | 10 2007 013 044 | 5/2015 |
| EP | 0 482 523 | 4/1992 |
| EP | 3 006 183 | 4/2016 |
| JP | 2001-293761 | 10/2001 |
| WO | 02/097545 | 12/2002 |
| WO | 2005/009719 | 2/2005 |
| WO | 2007/045073 | 4/2007 |

OTHER PUBLICATIONS

Kohleberger, "Continuous quality control in the injection molding of technical molded parts" Apr. 1997.
Documents provided in Third Party Opposition submitted in European Application No. 19710578.6.

* cited by examiner

Fig. 2

| Process stability | ⚠ |
|---|---|
| Machine | ✓ |
| Granulate | ✓ |
| Melt | ✓ |
| Filling | ✓ |
| Tool | ⚠ — Heatings ✓ / Temp. control ⚠ / Movements ✓ / Demoulding ✓ |
| Shaped part | ✓ |

Change relative to reference

| | Reference | Current |
|---|---|---|
| Throughflow zone 1 [l/min] | 5,5 | 3,0 |
| Throughflow zone 3 [l/min] | 10,0 | 8,1 |

Fig. 6

| Last cycle<br>Nr 18579<br>2018-01-12 – 07:18:22 | Compared to<br>Preceding values<br>☑ | Stored values<br>☑ |
|---|---|---|
| Dry and convey | ○ | ○ |
| Melt plastic | ◍ | ◍ |
| Fill mould | ○ | ◍ |
| Cool part | ○ | ○ |
| Mould and removal | ○ | ○ |
| Quality inspection | ○ | ◍ |
| | Show progress | Show progress<br>Time ref values<br>2017-09-28 – 08:09:10 |
| Settings | Signalling | Stored values |

METHOD AND DEVICE FOR VISUALIZING OR EVALUATING A PROCESS STATE

BACKGROUND OF THE INVENTION

The invention concerns a method, a computer program product, a visualization apparatus for a production installation, an evaluation apparatus for a production installation, and a production installation having such a visualization and/or evaluation apparatus.

Currently visualization apparatuses and evaluation apparatuses for production installations of the general kind involved afford the possibility of representing and/or monitoring hundreds of process variables ascertained from measurement values in the form of key figures.

Such key figures can be for example minima, maxima, average values or integrals of measurement curves which were recorded within a cyclic production process (production cycle).

Typically such curves occur as a function of time. Further key figures can also be moments in time (from the start of the measurement), at which the curve assumes a given property, that is to say the time of the maximum/minimum, the time at which the integral exceeds a given value, the time at which a defined value is reached, exceeded or fallen short, and so forth.

Key figures can also be derived from the combination of measurements with various sensors. If for example in a plastic injection moulding machine in the injection process the screw position, the injection pressure and the mould internal pressure are measured, key figures like the screw position at which the maximum injection pressure is reached, the mould internal pressure at the foremost screw position or the like can be determined by way of the linking parameter 'time'.

There is initially no expected value for key figures (other than in the case of actual values, for which there is usually an associated target value), they often arise out of a plurality of factors. As an example mention may be made of the maximum injection pressure in a plastic injection moulding machine, which is afforded inter alia from injection speed, geometry of the mould cavity, melt viscosity and tool temperature. It is precisely for those reasons that those variables are of such interest as it is possible therewith to deduce influencing variables which are not measurable or which are not measured directly, or a variation therein.

Target values are setting values for the production installation, which are preset by the operator, by a simulation software, by a setting assistant or a process optimisation system. Typically this involves numerical values (for example target temperatures, positions and speeds), Boolean values (on/off), character strings or the selection taken from a list.

A method of the general kind set forth and a visualization apparatus of the general kind set forth for a production installation having a cyclically operated shaping machine in the form of a plastic injection moulding machine are disclosed in DE 10 2007 013044 B4. The plastic injection moulding machine described therein has a machine control means which is so designed that in the operating state various process parameters of a current injection moulding cycle are compared to the corresponding process parameters of at least one preceding injection moulding cycle, in which case a stability parameter is formed from the changes in the various process parameters and, when a threshold value is exceeded by the stability parameters, a warning signal is displayed at a display device. Preferably a warning system is implemented by visualization of a traffic light system.

A disadvantage with that state of the art is that upon the occurrence of problems it is difficult to clearly establish wherein the cause of the problem lies.

US 20004/148136 A1 teaches the visualization of data for a production location by means of a large number of logical groups (see FIG. 6 of that specification), each logical group containing a production installation. Visualization or evaluation of data of the constituent parts of the production installations (cyclically operating shaping machine and peripheral equipment) is not possible.

SUMMARY OF THE INVENTION

The object of the invention is to provide a method, a computer program product, a visualization apparatus, an evaluation apparatus and/or a production installation, in which it is better possible to evaluate and/or is more easily comprehensible for an operator, what the cause of a problem is.

The method according to the invention permits simple visualization and/or evaluation of process variables of a production installation by an operator or by a computing unit, wherein the production installation in a minimum configuration contains only the cyclically operating shaping machine, but in practice also machines, apparatuses and devices (in general: peripheral devices) which are connected upstream and downstream or in parallel with the shaping machine. The association of process variables with given logical groups, which is preset at the factory, also provides the man skilled in the art with clues about the cause of changes, which in turn facilitates troubleshooting.

The logical groups can be formed in accordance with at least one of the criteria in the following list:
 installation region or components of the production installation (for example closing unit, injection unit, tool, back-flow blocking means and so forth),
 procedural step or state of a production process,
 properties of a moulding material being processed by the shaping machine,
 properties of a shaped part produced by the shaping machine,
 possible disturbances or errors in the production process,
 the existence of a desired state (for example 'closing behaviour of the blocking means is in order'),
 productivity and economic efficiency of the production installation or the production process or parts thereof, and
 environmental conditions of the production installation or the production process or parts thereof.

Grouping in logical groups can be effected for example in accordance with:
 process steps in the production cycle,
 function units in the production installation, especially the shaping machine, and
 physical variables of the production process or measures for preparation in relation to the production process (for example preheating of components of the shaping machine).

Especially adapted to the injection moulding machine the logical groups can be formed or provided as follows in relation to process steps, function units or physical variables:

The logical groups in relation to process steps in the production cycle can be (individually or in any combination):

logical group in relation to the process step 'drying and conveying plastic material into at least one plasticising unit of the injection moulding machine', for example referred to as 'drying and conveying', logical group in relation to the process step 'plasticising of the conveyed plastic material in the at least one plasticising unit of the plastic injection moulding machine', for example referred to as 'melting plastic', logical group in relation to the process step 'injection of the plasticised plastic material into at least one cavity of the plastic injection moulding machine', for example referred to as 'filling mould', logical group in relation to the process step 'cooling and removing and/or ejecting the shaped part produced by hardening of the plasticised plastic material injected into the at least one cavity', for example referred to as 'mould and removal', and logical group in relation to the process step 'closing and opening at least two tool portions fixed to mould mounting plates of the plastic injection moulding machine, by which the at least one cavity can be formed', for example referred to as 'closing and opening'.

The logical group 'drying and conveying' can include for example the process variables 'temperature of the plastic material', 'moisture content of the plastic material'.

The logical group 'melting plastic' can include for example the process variables 'temperature of the plasticised plastic material', 'power of a temperature control device of the plasticising unit', 'dynamic pressure in the space in front of the screw of the plasticising screw', 'rotary speed and/or torque of the plasticising screw'.

The logical group 'filling mould' can include for example the process variables 'injection pressure', 'screw advance speed of the plasticising screw'.

The logical group 'mould and removal' can include for example the process variables 'tool internal pressure', 'tool temperature', 'hot runner temperature', 'power of a temperature control device of the mould tool'.

The logical group 'closing and opening' can include for example the process variables 'closing force with which the tool portions can be pressed against each other by way of the mould mounting plates during injection', 'closing force distribution', 'separating force with which the mould parts are moved away from each other after hardening of the shaped part', 'stamping stroke when using a stamping tool'.

The logical groups in relation to function units of the production installation can be (individually or in any combination):

logical group in relation to 'plastic injection moulding machine' logical group in relation to 'closing unit of the plastic injection moulding machine' logical group in relation to 'injection unit of the plastic injection moulding machine' logical group in relation to 'rapid stroke device of the closing unit' logical group in relation to 'closing mechanism of the closing unit' logical group in relation to 'mould tool' logical group in relation to 'ejection device of the mould tool' logical group in relation to 'temperature control device of the mould tool' logical group in relation to 'plasticising unit of the injection unit' logical group in relation to 'metering drive of the plasticising unit' logical group in relation to 'injection drive of the plasticising unit' logical group in relation to 'handling apparatus for the plastic injection moulding machine'.

As it is clear to the man skilled in the art how the variables discussed above in relation to the logical groups for the process steps can be associated in relation to the logical groups for the function units, a corresponding explanation is dispensed with here.

The logical groups in relation to the physical variables of the production process can be (individually or in any combination):

logical group in relation to 'temperature', 'pressure', 'travel', 'volume', 'rotary speed', 'speed', 'force', 'time', 'power', 'torque' and so forth.

In regard to a method according to the invention, each selected process variable is associated with at least one logical group. There are provided at least two different logical groups, and for each logical group a state of the logical group is evaluated and/or visualized on the basis of the process variables associated with that logical group.

In regard to a visualization or evaluation apparatus according to the invention it is provided that various logical groups can be visualized and/or evaluated and that each selected process variable is associated with at least one of the logical groups and for each logical group a state of the logical group can be visualized and/or evaluated on the basis of the process variables associated with that logical group.

The visualization apparatus or evaluation apparatus according to the invention is preferably adapted for carrying out the method according to the invention. It should be noted that—to keep the present disclosure concise—the measures described in relation to the method according to the invention can also naturally all be provided individually or in any combination in a visualization or evaluation apparatus according to the invention.

The visualization apparatus or evaluation apparatus can be in the form of a single structural unit (and is then preferably arranged at the production installation) or can be in decentralised form. In the latter case individual or all components of the visualization or evaluation apparatus can be arranged at different locations remote from the production installation, for example in the form of a cloud solution. In this case also the visualization apparatus or evaluation apparatus must naturally have access to the process variables of the production installation, for example, by way of a remote data connection.

The visualization apparatus could be for example a display device formed by a mobile device (smartphone, tablet and so forth) or a display device arranged at the production installation, a computing unit provided by a server in the cloud and a storage medium in the cloud, the mobile device or the production installation. That similarly applies to the evaluation apparatus.

Preferably, the term cyclically operating shaping machine in accordance with the invention is used to denote a plastic injection moulding machine.

Protection is also claimed for a production installation which contains at least one cyclically operating shaping machine and a visualization or evaluation apparatus according to one of the described embodiments, or can be brought into data communication with same.

Each production installation therefore has a (and preferably only one) cyclically operating shaping machine. A cyclically operating shaping machine can naturally have a plurality of cyclically operating sub-units, in particular a plurality of cyclically operating plasticising and/or injection units. In that case the term cycle of the production installation is used to mean that period of time which occurs having regard to all cyclically operating sub-units. Optionally the production installation also has machines, apparatuses and devices which are arranged upstream and downstream or in parallel with the shaping machine and which can respectively make process variables available and which are preferably equipped with sensors for ascertaining measurement data. Examples of this are devices and installations for supplying the shaping machine or the shaping tool (cooling and temperature control devices, material conveyors, metering and mixing installations), for processing of the raw material (driers, dust extractors), devices for manipulation of the shaped parts (robots, conveyor belts, separating filters), installations for quality assessment (optical image processing, weighing devices, measuring devices), installations for further processing or treatment of the shaped parts or systems for measuring additional process variables from the tool (mould internal pressure, temperature, tool expansion or contraction) or the environment.

By way of example, an actual value, a target value, a key figure, a measurement value variation, a variable calculated from a plurality of preceding values like a drift, an increase or a scatter or an operating state is used as at least one selected process variable. Different examples can be used for different selected process variables.

A reference value can be any value which is used for a comparison with a process variable. A given reference value can be provided for a plurality of process variables or it is possible to provide a specific reference value for each process variable. Preferably, at least one reference value is selected from the following list, wherein it is also possible to combine at least two or even all of the following list entries:
- one or more time-preceding value or values of the selected process variable, for example a value which directly preceded in respect of time of the selected process variable or a drift or scatter,
- a value of the selected process variable, stored by the operator at a given time,
- a value calculated from a number of process variables,
- a target value for the selected process variable,
- an ideal value, determined by an expert system, for the selected process variable, and
- a variable, for example drift or scatter, calculated from the current value of the selected process variable and/or one or more preceding values in respect of time of a process variable.

A combination of the above list entries can be referred to as the reference state of the production process.

In accordance with the invention, therefore, process variables of a current working cycle do not necessarily have to be compared to those from preceding working cycles but the process variables (which do not imperatively have to refer to a working process) can also be ascertained at certain time intervals. In that way for example it is possible to observe heating operations in which no working cycle at all is implemented. In that case, the ascertained values for temperatures or volume flows of temperature control media would be a suitable basis for key figures which for example are ascertained every 10 seconds.

Preferably, time-discrete ascertainment of the values of the plurality of selected process variables is effected in one of the ways set out hereinafter:
- for a succession of production processes, preferably in each cyclic production process,
- upon the occurrence of a predefined event, for example each time the predefined event occurs the step of determining a new value is effected,
- at predetermined time intervals (for example every x seconds a new value).

The measures defined in the preceding paragraph can also be provided in relation to determining the deviation or the rate of change.

The following questions can be involved in evaluation of a process state:
- do the process variables change precisely in relation to the more recent past in the form of drifts or jumps or do they remain constant?
- have process variables changed since the establishment of the reference values stored at a defined time?
- were process variables altered by intervention of a user, a process controller, a process optimisation system or by external influences?
- should certain process variables, in particular target values be altered as certain key figures on the basis of stored expert knowledge or on the basis of a comparison with the past are unfavourable?

The quality of a production process (process quality) initially does not have any direct relationship to the quality of the shaped parts produced. Nonetheless it is assumed that a good process quality represents the basis for a constant quality in respect of the shaped parts. By observing the process quality it is possible for faults to be recognised at an early time, upon a worsening a quality assessment of the shaped parts can be implemented, the result of which can be brought into relationship for future assessment with the specific variation in the process quality. Correlations can be learnt from those relationships or a self-learning system (machine learning) can be supplied with those correlations as input.

It is particularly preferable that logical groups are arranged in at least two hierarchy levels in such a way that at least one logical group of a lower hierarchy level is associated with another logical group of a higher hierarchy level. By grouping and cumulation of the information the method can be scaled by production installations (shaping machines including peripheral devices), generalized to production cells, production facilities or production locations.

For example it can be preferred that
- in a (preferably uppermost) hierarchy level the logical groups are selected in relation to process steps in the production cycle,
- in a lower (preferably next lower) hierarchy level the logical groups are selected in accordance with function units of the production installation, and
- in a further lower (preferably lowermost) hierarchy level the logical groups are selected in accordance with physical parameters.

The logical groups of an upper hierarchy level can therefore contain logical groups of one or more lower hierarchy levels.

For example being specifically adapted to a plastic injection moulding machine it can be provided that:
- a hierarchy level contains those logical groups which were selected in relation to 'process steps of the production cycle',
- a lower hierarchy level for each of the logical groups of the upper hierarchy level contains those logical groups which were selected in relation to the 'function units of the production installation' but only for those function units of the production installation which are involved in the respective process step, and a further lower hierarchy level for each of the logical groups of the upper hierarchy level contains those logical groups which were selected in relation to 'physical variables of the production process' but only for those physical groups which are relevant in relation to the selected function unit.

If the deviation of a key figure of a group exceeds a predetermined value, an action can be triggered, for example a message is output to the operator in relation to the logical group in question.

Bringing together the evaluation of individual process variables in a plurality of hierarchy levels gives an overall overview about the state of the process, starting from which the operator can provide the desired information along the hierarchical structure in various planes to the individual process variables, or the visualization device automatically represents those items of information to the operator. In relation to an evaluation with or without visualization the advantage is that actions which are to be carried out automatically can be better defined.

Various algorithms can be used for determining the deviation or the rate of change for selected process variables. Examples:
moving average value from a plurality of values, filtering, smoothing,
scatter from a plurality of values,
maximum, minimum and moments in time of the occurrence,
average value, integral,
median,
calculation of the gradient from a plurality of values,
recognition of bends in signal configurations, and
difference in a value in relation to the reference value.

The results of the algorithms can be checked for relevance with limit values. Those limit values can, for example:
(a) be stored as a result of expert systems or
(b) be obtained from a self-learning system,
(c) be fixedly pre-defined,
(d) ascertained in accordance with a calculation rule on the basis of machine or process variables,
(e) be based on empirical values,
(f) be predetermined by user input.

Numerical examples for cases (a) and (b):
In the calculation of the gradient of a cylinder temperature signal a gradient of 0.5 Kelvin/second is found.
(a) The stored limit value for the relevance of a cylinder temperature gradient is 0.3 Kelvin/second, thus the rate of change is classified as relevant.
(b) In ongoing production the rates of change which occur of the temperature were stored. In 99% of the observed cases the rate of change was less than 0.4 Kelvin/second, thus the value actually ascertained is classified as relevant.

In an embodiment of the invention, instructions for process optimization or troubleshooting are given to the operator. They can be stored as the result of an expert system. As an alternative thereto the method can store the actions set by the operator for eliminating the deviations recognised, therefore learn them and later make them available to the same operator or other operators or bring them to their attention as a suggestion.

In an embodiment of the invention, process optimization or troubleshooting can be carried out automatically by settings (for example target values) of the production process and/or the production installation being automatically altered and/or by the production being interrupted and/or replacement part orders being triggered and/or notified to customer services.

A further dimension in visualization and/or evaluation can be introduced in the form of observation levels, wherein an observation level represents a status of the process state of the production process and/or the production installation, more specifically beyond the limits of the logical groups.

An embodiment of the invention provides that determination and/or display of the deviation or rate of change is effected along observation levels. It is only when an observation level was found to be in order (the process variables associated with that observation level were found to be in order in regard to deviation or rate of change in relation to the at least one reference value), determination and/or display of the deviation or rate of change is effected in relation to a process variable of a next level. Suitable observation levels can be:
status (are heating means, temperature control circuits switched on?),
plausibility of actual values (are meaningful values delivered? If not a sensor could be defective),
are (regulated) actual values in a steady state, therefore near the associated target value?
are key figures in a steady state?
are key figures similarly as in the reference state?
setting quality (are there proposals based on expert systems for improving the process quality by a change in target values?)

In addition, there can also be observation levels, in relation to which determination and/or display of the deviation or rate of change is effected in relation to a process variable, irrespective of how observation planes arranged higher or lower are evaluated.

Preferably, the results of determination of the deviation or rate of change are made available on a display device, for example a display on the production installation, a mobile device or a production control system, and are there subjected to further processing and/or are visualized.

Preferably, the total overview of the process state includes jump-off points in relation to thematically associated screen pages of the control means, the production control system, the mobile device and so forth. Jump-off points are links which permit a rapid change between screen pages ('jumping'). It is also preferably provided that the logical groups of a hierarchy level are so selected that a screen page which can be visualized by means of the display device can be associated with each logical group. That is the case for example in regard to the above-described logical group 'function units of the production installation', if the screen pages which can be visualized by means of the display device are divided to correspond to the function units (for example screen pages 'injection', 'metering', 'mass cylinder heating', 'mould opening', and so forth). As an alternative to 'jumping' to linked views it is naturally also possible to integrate the detail information relevant to the respective situation into the summary overview.

Preferably, it is automatically evaluated whether a reference value may be written by the operator, in relation to the selected process variable, in the current state. That can be made dependent on to what observation level the logical groups have been found to be in order. That can apply to all logical groups or only to those which are affected by a given reference value.

Preferably, different reference values and/or relevance values are used depending on the respective instantaneous situation of the production installation (for example shaping machine ready for production start, production start, shaped parts ready for use and so forth).

In the event of predetermined deviations or rates of change, actions to be implemented are proposed to the operator or are just carried out automatically. The shaped parts produced can be graded as reject.

The user can select a signalling means (alarm message, alarm lamp, SMS, e-mail and so forth), for the situation where a process variation is soon to be observed.

Evaluation and/or visualization of process alterations in a last cycle of the production process can be effected in relation to one or more preceding cycle or cycles in the production process and/or in relation to a set of process variables stored at a user-defined time (which naturally can remain constant in time until they are altered or deleted, also referred to hereinafter as relational values), preferably grouped according to process steps. Visualization can be effected for example in the form of a traffic light representation or a target disc representation.

In that respect, a comparison of the process variables with those of the last cycle or cycles can be effected for example in such a way that drifts, scatters, change in scatters and so forth are displayed. No user actions are required for that purpose. The monitored parameters and monitoring limits are pre-defined at the factory and/or are autonomously learnt in the course of production. Adaptations by the user are possible but are not necessary.

A comparison with process variables stored at a user-defined time (relational values) can be effected for example in this way: to be able to carry out such comparison the user must establish the current or a selected preceding cycle of the production process as the reference cycle. The reference cycle can be set for all groups/parameters or for selected groups/parameters. As an alternative thereto, relational values can be manually input. Prior to the setting of a relational value, the user is notified whether the time for that is or is not now appropriate. A time is appropriate when now no process changes on the basis of preceding values are detected.

Relational values can be stored for example in the parts data set of the production installation or more precisely of the shaping machine so that they can be read in again upon next setting-up of the same tool.

In addition to visualization of process changes, a target value alteration effected or an installation stoppage due to a change in mode of operation can be displayed.

In relation to visualization in a target disc representation, a quadrant in that co-ordinate cross in which the target disc is visualized can be attributed to each logical group to be visualized.

Preferably, a common representation of the deviation from preceding values and values stored as a reference is in the form described hereinafter:

The standardized movement of parameters from their associated stored value is symbolized in the target disc by the spacing from the center point.

Parameters which deviate from the stored relational value are more or less away from the center point depending on the respective extent of their deviation. If they do not change at the moment they are visualized as points. If the parameters change at the moment they are not visualized as points but as arrows, more specifically in such a way that the direction of the change relative to the stored relational value is visualized by the direction of the arrow relative to the center point.

BRIEF DESCRIPTION OF THE DRAWINGS

FIG. 2 is a chart illustrating determining and visualizing the deviation from a reference value;

FIG. 6 is a chart illustrating a traffic light representation of process changes of a further embodiment;

FIG. 9 is a chart showing a progress representation in relation to FIG. 8a; and

DETAILED DESCRIPTION OF THE INVENTION

Figure 1:
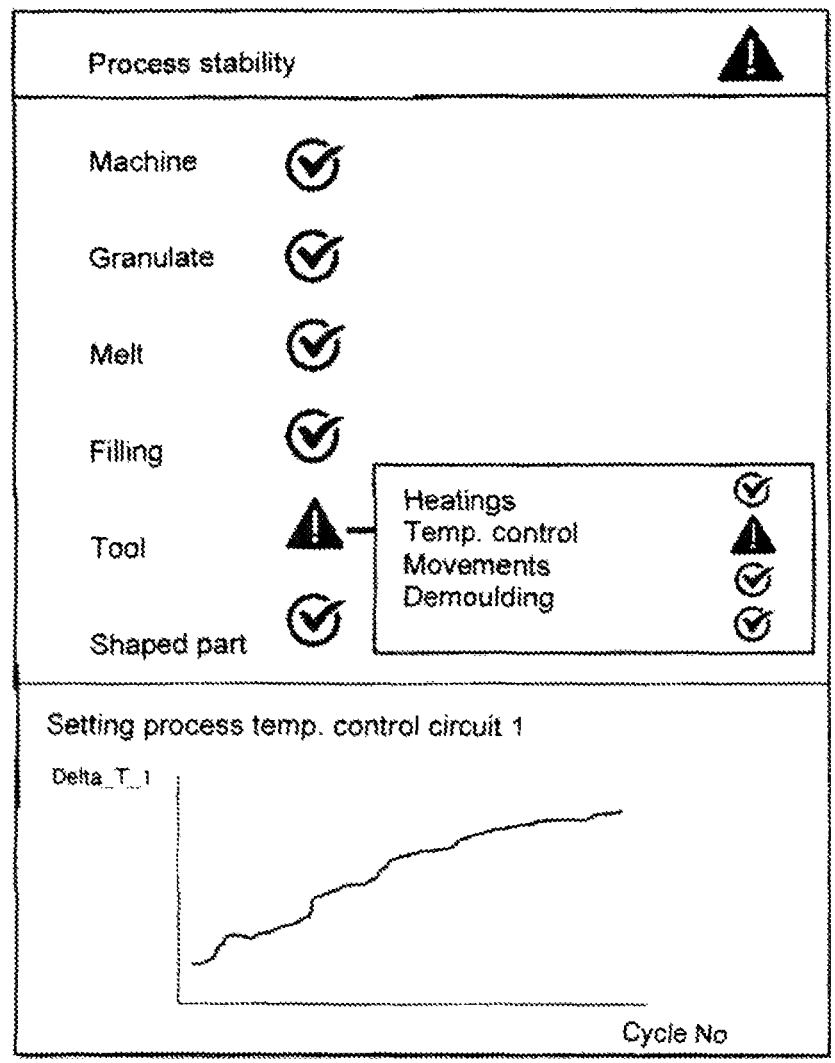
FIG. 1 is a chart illustrating determining and visualizing a change in a value of a process variable relative to the recent past.

First embodiment of the invention (FIG. 1)—determining and visualizing the change in the value of a process variable relative to the more recent past:

The shaping machine is in the form of a plastic injection moulding machine. The description hereinafter, however, equally applies to other forms of shaping machines.

The visualization program is of a hierarchical structure. The highest hierarchy level contains the logical group 'process stability'. Provided on an underneath hierarchy level for evaluation of process stability are the logical groups 'machine', 'granulate', 'melt', 'filling', 'tool' and 'shaped part'. Associated with each logical group of that upper hierarchy level on the next lower hierarchy level is at least one other logical group. For example here the logical group 'tool' includes the subgroups 'heatings', 'temperature control', 'movements' and 'demoulding'.

Associated with the logical group 'temperature control' is inter alia the key figure Delta_T_1. The value describes the temperature difference between the flow and the return of a temperature control medium passage of a tool. That process variable is measured in each working cycle (cycle No). A gradient is calculated from the comparison of the respectively current value with the preceding values. If the gradient exceeds a reference value in the form of a stored limit value then that is evaluated as instability and the logical group 'temperature control' is provided with a warning symbol (here shown by way of example as a call sign). As the logical group 'temperature control' is a subgroup of the higher logical group 'tool' that higher logical group also has the warning call sign symbol. The uppermost hierarchy level here contains the logical group 'process stability', that is now also marked with a call sign. Those logical groups which by virtue of the process variables associated therewith were found to be in order are marked with a tick symbol.

In that way, variations can be evaluated in comparison with the fairly recent past like, for example, drifts, abrupt changes or increasing scatter effects.

In the illustrated embodiment, in addition to the illustrated symbols, ticks and call signs there can also be colour codings, namely the colour green in connection with the tick and the colour red in connection with the call sign. The colour codings could also be provided alternatively to identification with symbols. Alternatively, it would be possible to provide only symbols, pure text indications or symbols combined with text indications (optionally with additional colour coding). Those statements apply generally to the invention.

Second embodiment of the invention (FIG. 2)—determining and visualizing the deviation from a reference value:

The shaping machine is in the form of a plastic injection moulding machine. The description hereinafter however equally applies to other forms of shaping machines.

In this embodiment, comparison is effected with a reference state established by the operator. Here the media flows have changed in two temperature control circuits.

Figure 3:
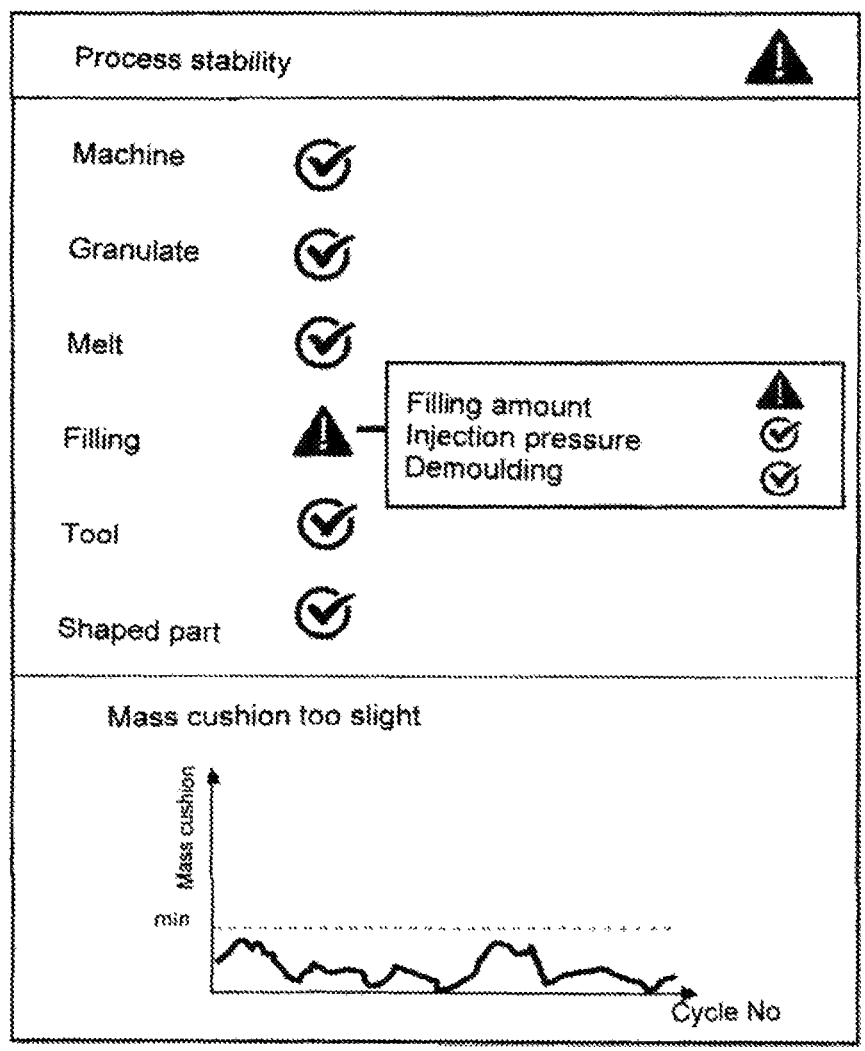
FIG. 3 is a chart illustrating use of knowledge of an expert system.

Third embodiments of the invention (FIG. 3)—use of knowledge of an expert system:

The shaping machine is in the form of a plastic injection moulding machine. The description hereinafter however equally applies to other forms of shaping machines.

In this embodiment, the process variable 'mass cushion' (=foremost screw position during injection and holding pressure) is compared to a minimum value stored in the form of knowledge of an expert system, as a reference value, and is graded as being too slight.

Fourth embodiment of the invention (FIGS. 4 and 5)—information filtering with observation levels:

The shaping machine is in the form of a plastic injection moulding machine. The description hereinafter however equally applies to other forms of shaping machines.

Figure 4:
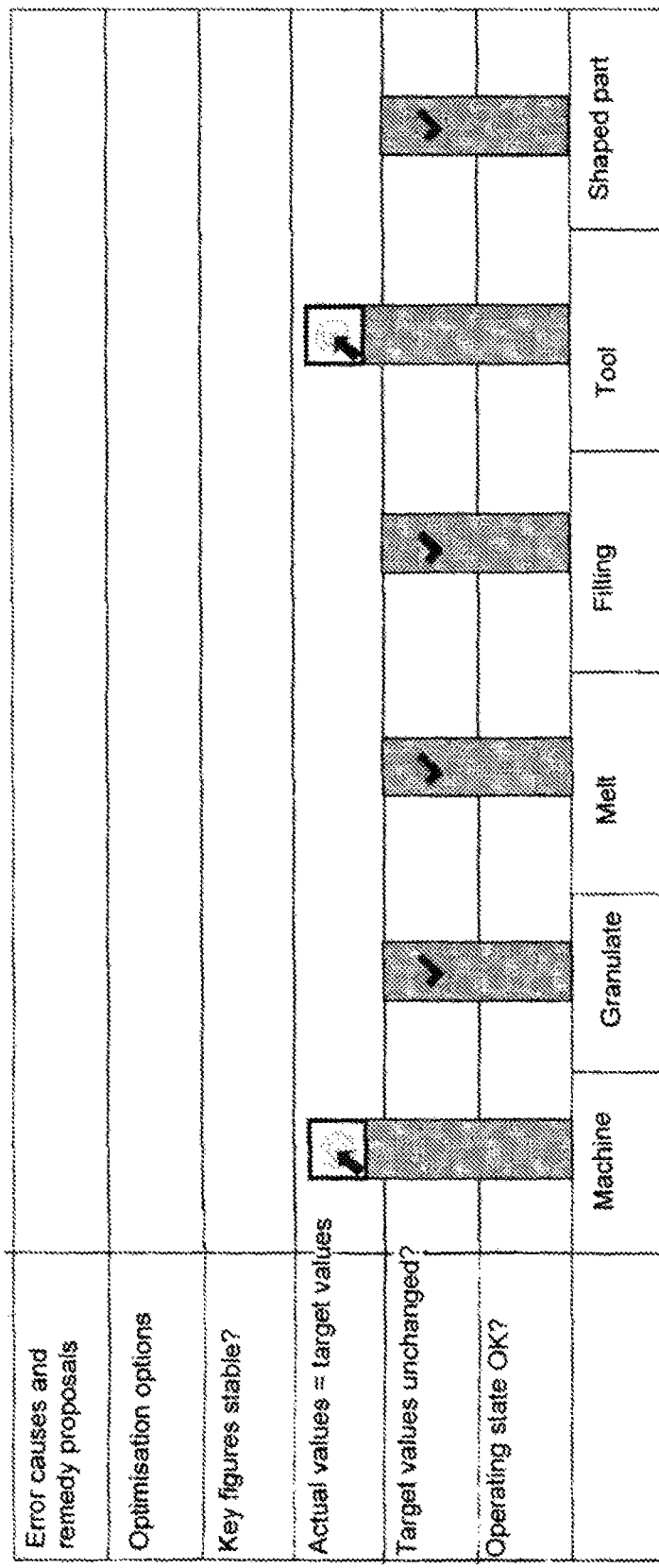
FIGS. 4 and 5 are charts illustrating information filtering with observation levels.

FIG. 4 plots from left to right logical groups ('machine', 'granulate', 'melt', 'filling', 'tool' and 'shaped part') of a given hierarchy level, with which certain target values, actual values, state variables and key figures are associated. Shown in an upward direction are observation levels which are here evaluated in succession (upwardly) and evaluate and visualize various states of the production process or the production installation which can be of interest to an operator.

FIG. 4 shows by way of example a situation prior to production start of a plastic injection moulding machine. The heatings are switched on, the target temperatures, however, are not yet reached. The temperature actual values of machine (cylinder heating) and tool are moving in the direction of the target values. It is only when the target values are reached that the next step in evaluation is effected—stability of the associated process variables. The logical groups 'granulate', 'melt', 'filling' and 'shaped part' can only be evaluated in that state insofar as the target values were not changed in relation to a reference.

Figure 5:
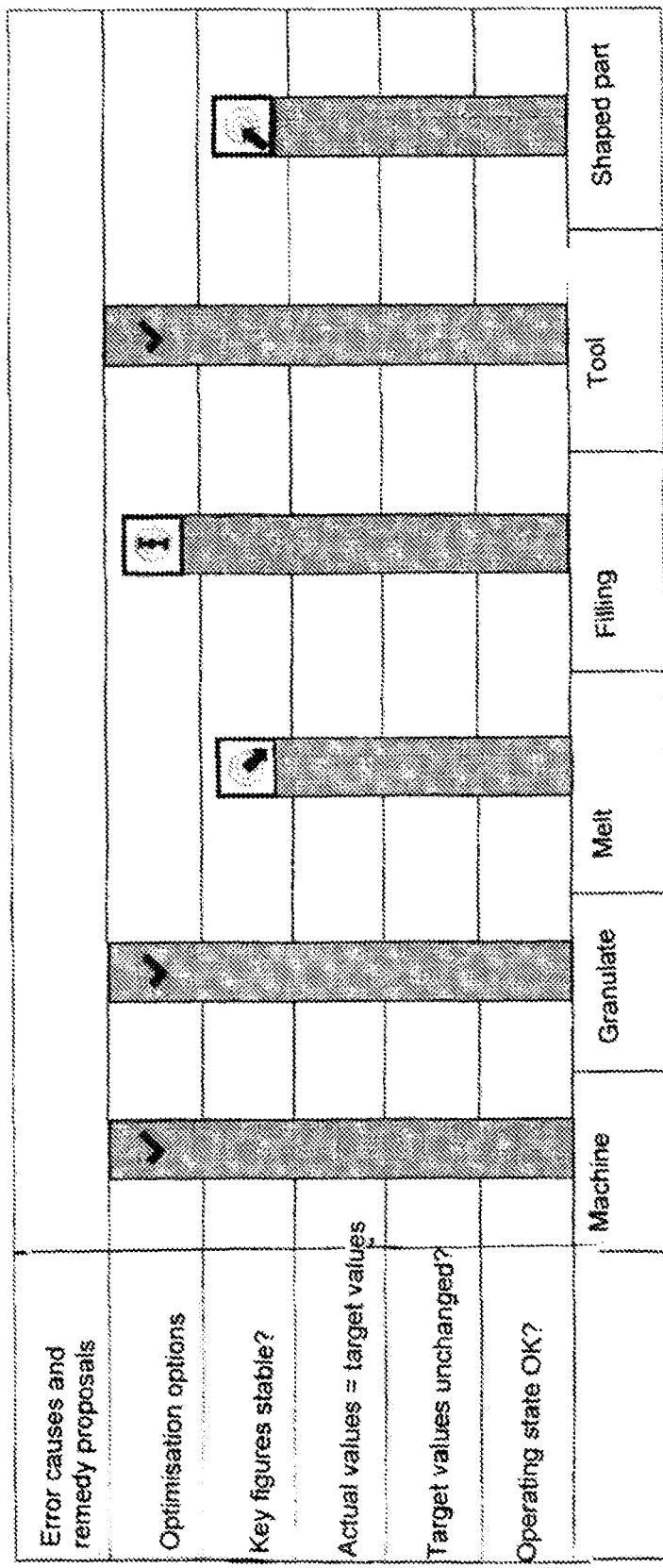

FIG. 5 shows a possible state during production (therefore at a later time than in FIG. 4). One or more process variables which are suitable for evaluating the logical group 'melt' are moving away from that value which was established at the time of fixing the corresponding reference value.

A process variable which is suitable for evaluating the logical group 'filling' has a higher degree of scatter compared to the reference. A process variable which is suitable for evaluating the quality of the logical group 'shaped part' drifts in the direction of the reference value stored in the referencing operation.

The shaping machine in the fifth embodiment of the invention (FIGS. 6-9) is in the form of a plastic injection moulding machine. The description hereinafter equally applies however for other forms of shaping machines.

Figures 8A, 8B:
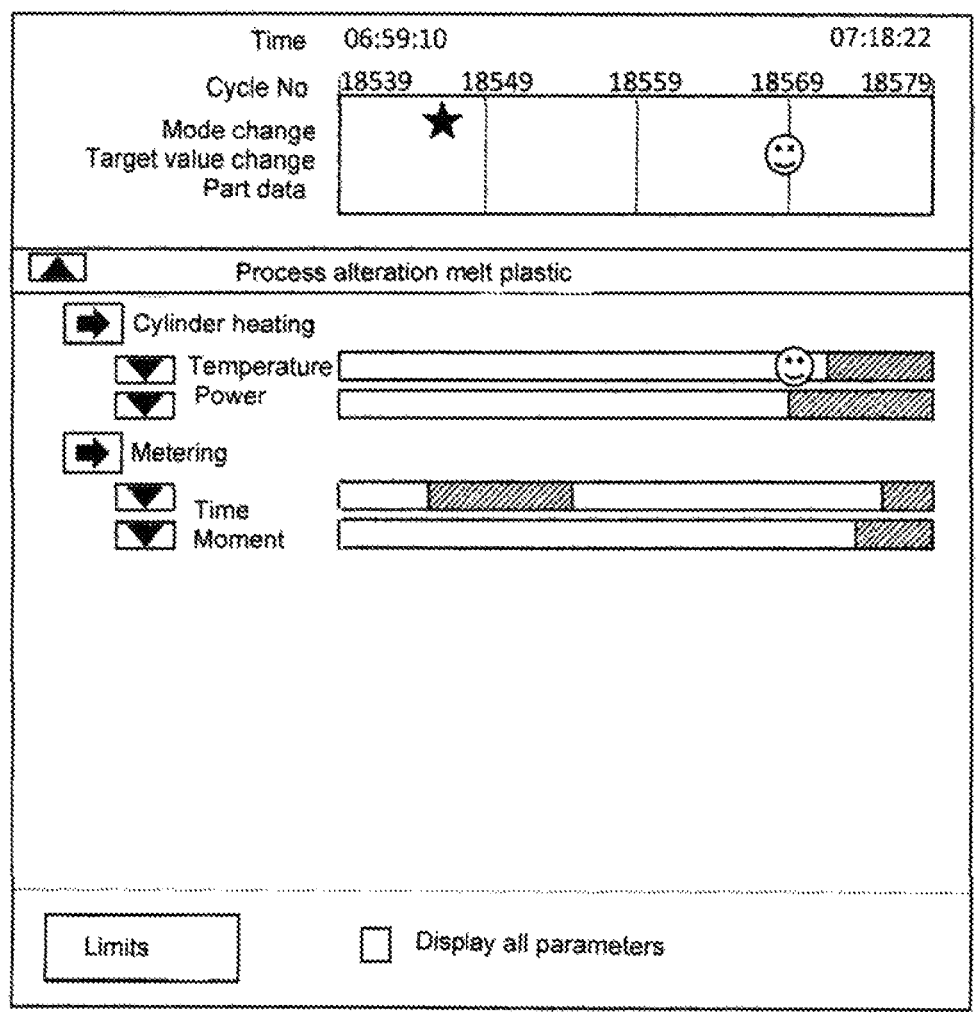
FIGS. 8a and 8b are charts illustrating progress representation without curves.

The embodiment in FIG. 6 provides a traffic light representation of process changes in the last cycle in relation to immediately preceding relational values (left-hand representation) and in relation to relational values stored at a user-defined time (right-hand representation). Six logical groups are evaluated and visualized. Grouping is effected in accordance with process steps (here for example 'dry and convey', 'melt plastic', 'fill mould', 'cool part', 'mould and removal', 'quality inspection'). By way of the buttons 'show progress' it is possible to view a variation in respect of time (thus as shown in FIG. 8a, a change is made to the corresponding page). In the present example there are changes in relation to the solid circles (for example yellow in colour). Representation options for visualization can be selected by way of the button 'settings'. It is possible for example to select how many preceding cycles in terms of evaluation and visualization are to be adopted as the basis. By way of the button 'signalling' the user can select signalling (alarm message, alarm lamp, SMS, e-mail and so forth), for the situation where a change in process is soon to be observed. By way of the button 'stored values' those relational values which form the basis for the comparison shown on the right-hand side can be input, altered or deleted. By way of the boxes shown in the top line of the representation it is possible to make a selection in respect of the visualization option by setting a tick (in the present case both visualization options have been selected). FIG. 6 visualizes that in this example there is a deviation from the preceding values (only) in relation to the logical group 'melt plastic'. More precise analysis is available to the user by choosing the button 'show progress', by means of which he changes to the page shown in FIG. 8a.

Figure 7:
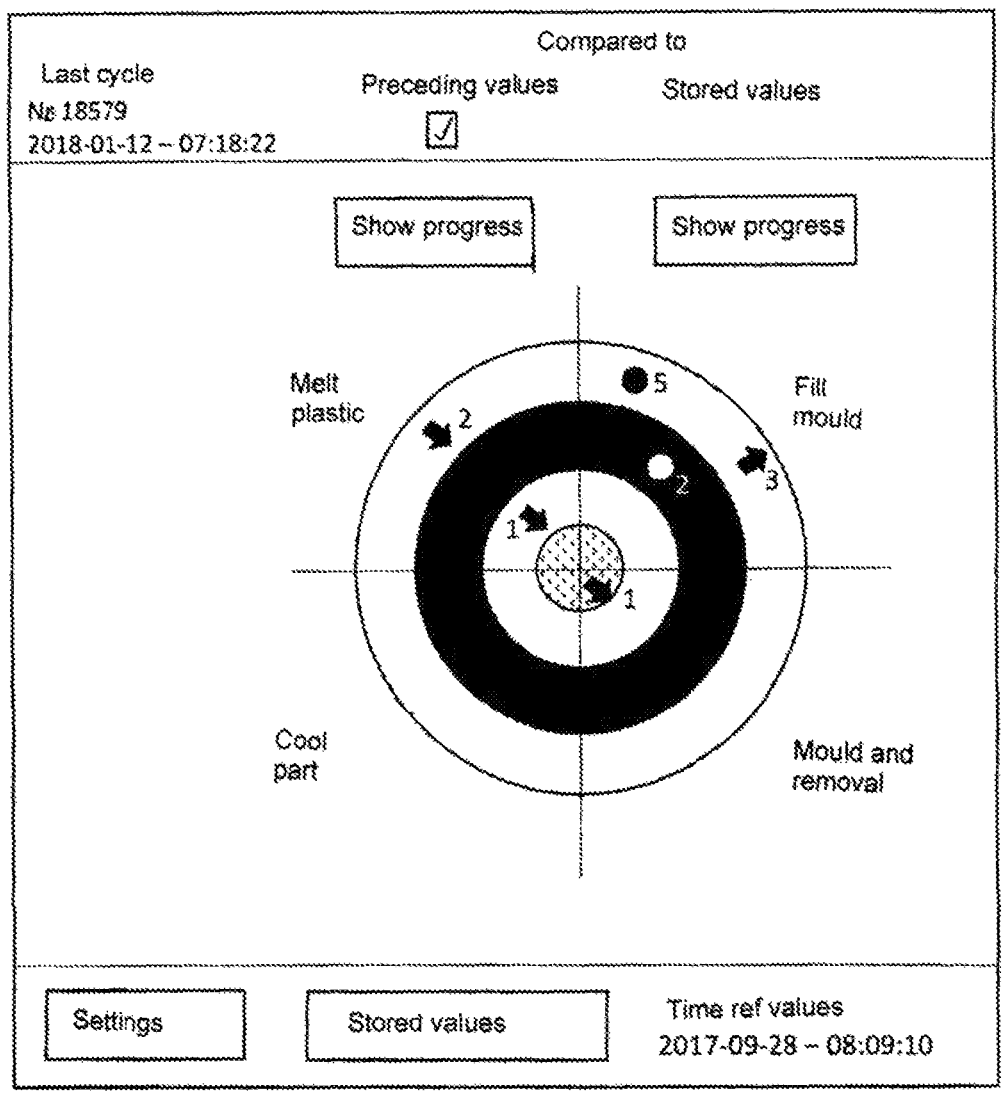
FIG. 7 is a chart illustrating a target disc representation of process changes of a further embodiment.

In the FIG. 7 embodiment a target disc representation of process changes in the last cycle of the production process in relation to preceding and stored values was selected. Four logical groups are visualized, a quadrant in the illustrated co-ordinate cross being attributed to each logical group.

This example involves optional joint representation of the deviation from preceding values and values stored as a reference, in the form described hereinafter:

The standardized removal of parameters from their associated stored value is symbolised in the target disc by the spacing from the centre point.

Parameters which deviate from the stored relational value are more or less away from the centre point depending on the respective extent of their deviation. If they do not change at the moment they are visualized as points (by way of example two such points are shown in the view). If the parameters change at the moment they are not visualized as points but as arrows, more specifically in such a way that the direction of the change relative to the stored relational value is visualized by the direction of the arrow relative to the centre point (four such arrows are to be seen by way of example in the representation).

The comparison with the preceding values is therefore so effected that parameters which are visualized as points do not exhibit any deviation from that value which they had in the preceding cycle or cycles.

A 'tolerance' which is preset at the factory and/or can be predetermined establishes from what deviation from the stored relational value visualization is effected.

A representation of aggregation and the extent of the deviation is effected in the form described hereinafter:

Parameters which are remote from the stored reference value less than a permissible tolerance are in the innermost circle in the target disc. If they are in the target region and do not change they are not represented for the sake of clarity. Each further circular ring symbolises a spacing around the predetermined tolerance. If a parameter is in the outer white ring it is therefore 3-4 times outside the tolerance.

Instead of representing each parameter individually this example provides for implementing aggregation in the manner described hereinafter. In the process step 'fill mould' for example 5 parameters are 3-4 times outside the tolerance. Those values are stable and therefore do not change at the moment and are therefore visualized as points. A further three parameters in that segment of the circle are further away from their stored relational value and are therefore visualized as arrows in a direction away from the centre point. Naturally any other kind of grouping is possible.

By pressing one of the buttons 'show progress' that gives a progress representation over a defined period of time or a defined number of cycles.

In this embodiment it is only possible to select the comparison with the preceding values. In such a case all parameters are visualized as points.

The embodiment of FIG. 8a involves progress representation without curves: the configuration of the process change in relation to preceding values is represented over the last 40 cycles (naturally another number could also be set). Results which can concern a number of logical groups are represented as symbols in the header (on the common x-axis).

It can be seen that for example between cycles No 18539 and No 18549 a change in mode of operation took place (indicated by a star). Between cycles No 18559 and No 18569 the user performed a change in target value (here indicated for example by a smiley).

Hierarchical logical grouping is effected according to: process steps-function units-physical variable. By way of example the hierarchy is shown for the group 'melt plastic' (as a process step), with the subgroups 'cylinder heating' and 'metering' (as function units) and the respective further subgroups 'temperature' and 'power' or 'time' and 'moment' (as a physical variable). It can be seen that the change in target value shown in the header was effected in relation to a temperature of the cylinder heating. The hatched regions in 'temperature' and 'power' show an alarm situation which occurred by virtue of the alteration made. The same applies in regard to the right regions in the subgroups 'time' and 'moment' of the subgroup 'metering' while the left hatched region in the subgroup 'time' is a consequence of the change in the mode of operation.

FIG. 8b explains the significance of the symbols which can be seen in FIG. 8a.

An automatic preselection can be provided:

If the user changes to that page then only those logical groups or parameters are displayed, which have experienced an alteration in the set observation period (here 40 cycles). Automatic preselection of those items of information which are relevant at the moment is therefore effected. By activating the function 'display all parameters' the user can also view the parameters which are stable in the observation period.

A process alteration is shown in the example. In this case the parameters are compared in each cycle to their most recent past. If for example a temperature changes from 220° C. to 230° C. that transitional period is characterized until the new stable temperature is reached.

The illustration of the process alteration in relation to stored relational values would appear similarly. The difference however is that the marking of the time span ends only when the state at the time of the user-defined storage is restored.

By way of the button 'limits' it is possible to set acceptable tolerances or (if they are predefined at the factory) alter them.

Figure 9:
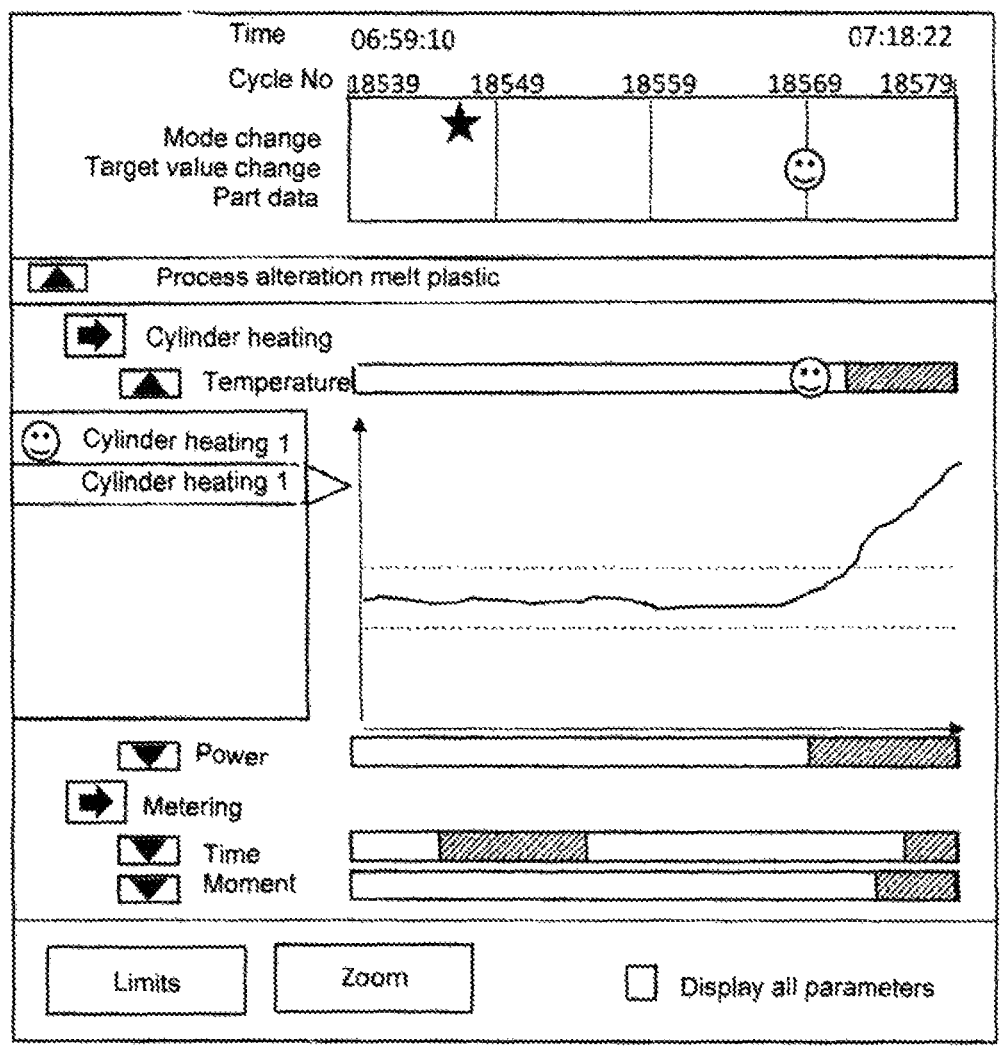

The embodiment of FIG. 9 shows a progress representation in relation to FIG. 8a with extended curve region of the physical variable 'temperature':

This involves a representation of the curve configuration with tolerances shown in broken line (limits). The tolerances are predefined at the factory but can be altered by the user. The establishment of tolerances can be effected for individual parameters or for parameter types (for example all temperatures, all cylinder temperatures, and so forth).

It is possible to provide a parameter selection in the form such that a set of parameters to be monitored is predefined at the factory, but the monitoring of each parameter can be deactivated by the user.

The measures shown in FIGS. 6 to 9 in relation to an embodiment of the invention can also be provided individually or in any combination.

In relation to the above-discussed embodiments of a visualization apparatus it is true to say that they equally apply in relation to an evaluation apparatus if visualization is not considered to be obligatory.

Figure 10:
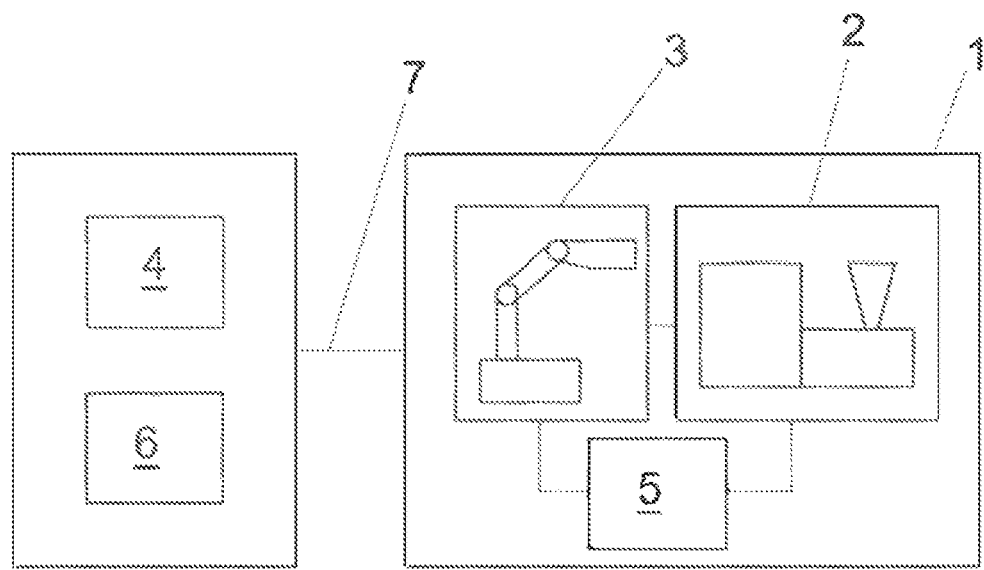
FIG. 10 is a schematic diagram showing a production installation including a shaping machine.

FIG. 10 diagrammatically shows a production installation 1 including a shaping machine 2 and a handling apparatus 3. A computing unit 4 and a storage medium 6 are connected to a display device 5 by way of a data connection 7 to provide the evaluation and/or visualization apparatus.

The display device 5 can be in the form of a screen of a machine control means of the shaping machine 2 and/or in the form of a web portal and/or in the form of a visualization apparatus which can be carried or worn on a body (for example a handheld device like a tablet or VR glasses).

Otherwise than as illustrated, the computing unit 4 and the storage medium 6 could naturally also be a part of the shaping machine 2, for example a part of the machine control means.

An evaluation program is stored in the storage medium 6, wherein various logical groups can be imaged by the evaluation program and each selected process variable is associated with at least one of the logical groups and for each logical group a state of the logical group can be evaluated on the basis of the process variables associated with that logical group.

In addition a visualization program is stored in the storage medium 6, wherein various logical groups can be visualized by the visualization program and each selected process variable is associated with at least one of the logical groups and for each logical group a state of the logical group can be visualized by the display device 5 on the basis of the process variables associated with that logical group.

LIST OF REFERENCES AND TERMINOLOGY USED 1 production installation
2 shaping machine
3 handling apparatus
4 computing unit
5 display device
6 storage medium
7 data connection
Measurement value: value delivered by a sensor or a value determined on the basis of the signals delivered by the sensor, of a physical variable of the production installation, one of its components or the process material
Process variable: variable ascertained from a measurement value or values, can be represented in the form of one or more key figures Key figure variable ascertained from a process variable like for example properties of measurement curves; time at which measurement variables assume given values, and so forth Target value setting value for the production installation Reference value value which is used for a comparison with a process variable Reference state combination of reference values at a given time which characterises the state of the production installation or parts thereof at that time Relational value special form of a reference value, namely process variable stored at a user-defined time for comparison with one or more process variables Tolerance value (for example in the form of a band around a curve) which specifies from what deviation visualization and/or evaluation is effected.

The invention claimed is:

1. A method of evaluating and visualizing a process state of a production installation which contains at least one cyclically operating shaping machine, wherein continuously or in time-discrete relationship the value of a plurality of selected process variables is ascertained and the respective current value of each selected process variable or a variable derived therefrom is compared to one or more reference values by means of a computing unit and a deviation or a rate of change is determined, wherein each selected process variable is associated with at least one logical group by the computing unit, wherein there are provided at least two different logical groups, and logical groups are arranged in at least two hierarchy levels in such a way that at least one logical group of a lower hierarchy level is associated with another logical group of a higher hierarchy level, and for each logical group a state of the logical group is evaluated by the computing unit on the basis of the process variables associated with said logical group and is visualized by means of a display device.

2. The method according to claim 1, wherein an actual value, a target value, a key figure, a measurement value configuration, a variable calculated from a plurality of preceding values or an operating state is used as at least one selected process variable.

3. The method according to claim 1, wherein in determining the deviation or the change the computing unit takes account of whether there was a change caused by an operator, a process controller, a process optimisation system or by external influences.

4. The method according to claim 1, wherein at least one reference value is selected from the following list:

one or more time-preceding value or values of the selected process variable, for example a value which directly preceded in respect of time of the selected process variable or a drift or scatter, a value of the selected process variable, stored by the operator at a given time, a value calculated from a number of process variables, a target value for the selected process variable, an ideal value, determined by an expert system, for the selected process variable, and a variable calculated from the current value of the selected process variable and/or one or more preceding values in respect of time of a process variable.

5. The method according to claim 1, wherein time-discrete ascertainment of the values of the plurality of selected process variables and/or determination of the deviation or rate of change is effected in one of the following ways:

for a succession of production processes, upon the occurrence of a predefined event, and at predetermined time intervals.

6. The method according to claim 1, wherein the logical groups are formed in accordance with at least one of the criteria in the following list:

installation region or components of the production installation, procedural step or state of a production process, properties of a moulding material being processed by the shaping machine, properties of a shaped part produced by the shaping machine, possible disturbances or errors in the production process, the existence of a desired state, productivity and economic efficiency, and environmental conditions.

7. The method according to claim 1, wherein:

in a first hierarchy level, the logical groups are selected in relation to process steps in the production cycle, in a second hierarchy level lower that the first hierarchy level, the logical groups are selected in accordance with function units of the production installation, and in a third hierarchy level lower than the second hierarchy level, the logical groups are selected in accordance with physical parameters.

8. The method according to claim 1, wherein the logical groups of a hierarchy level are selected so that a screen page which can be visualized by means of the display device is associated with each logical group.

9. The method according to claim 1, wherein at least two observation levels are used, wherein one observation level represents a status of the process state of the production process and/or the production installation.

10. The method according to claim 9, wherein determination and/or display of the deviation or rate of change is effected along observation levels in such a way that determination and/or display of the deviation or rate of change of a next level is effected only when a previous observation level was found to be in order.

11. The method according to claim 1, wherein instructions are given to an operator for process optimisation or troubleshooting.

12. The method according to claim 1, wherein process optimisation or troubleshooting is carried out automatically by target values of the production process or the production installation being automatically altered and/or production being interrupted and/or spare part orders being triggered and/or customer services being notified.

13. The method according to claim 1, wherein evaluation and/or visualization of process alterations of a last cycle of the production process is effected in relation to one or more preceding cycles of the production process and/or in relation to a set of process variables stored at a user-defined time.

14. The method according to claim 1, wherein in addition to the visualization of process alterations a change in target value effected or an installation stoppage due to a change in operating mode is visualized.

15. The method according to claim 1, wherein only those logical groups or parameters are displayed, which have experienced an alteration in an observation period which is or can be set.

16. A non-transitory computer readable recording medium having stored thereon a computer program product comprising commands which in execution of the program by a computing unit cause it to carry out the method according to claim 1.

\* \* \* \* \*